(12) United States Patent
Rafidi (10) Patent No.: US 9,403,123 B2
(45) Date of Patent: Aug. 2, 2016

(54) HIGH ROTATIONAL MOMENTUM DISPERSER AND USE

(71) Applicant: ALSTOM Technology Ltd, Baden (CH)

(72) Inventor: Nabil Elias Rafidi, Vaxjo (SE)

(73) Assignee: ALSTOM Technology Ltd, Baden (CH)

( * ) Notice: Subject to any disclaimer, the term of this patent is extended or adjusted under 35 U.S.C. 154(b) by 0 days.

(21) Appl. No.: 14/312,984

(22) Filed: Jun. 24, 2014

(65) Prior Publication Data

US 2015/0367282 A1 Dec. 24, 2015

(51) Int. Cl.
| | |
|---|---|
| *B01D 53/79* | (2006.01) |
| *B01D 53/18* | (2006.01) |
| *B01D 53/50* | (2006.01) |
| *F26B 3/12* | (2006.01) |
| *B05B 7/10* | (2006.01) |
| *B05B 15/02* | (2006.01) |

(52) U.S. Cl.
CPC .............. *B01D 53/79* (2013.01); *B01D 53/185* (2013.01); *B01D 53/504* (2013.01); *B01D 53/505* (2013.01); *F26B 3/12* (2013.01); *B05B 7/10* (2013.01); *B05B 15/025* (2013.01)

(58) Field of Classification Search
CPC .. B01D 53/185; B01D 53/504; B01D 53/505; B01D 53/78; B01D 53/79; B01D 53/80; B01D 53/18; B01D 53/1481; F26B 3/12
USPC .................. 422/168, 169, 176; 96/303, 304; 423/243.08; 261/79.2
See application file for complete search history.

(56) References Cited

U.S. PATENT DOCUMENTS

| | | | |
|---|---|---|---|
| 2,612,405 | A | 9/1952 | Kirschbaum |
| 4,226,603 | A | 10/1980 | Larsson et al. |
| 4,380,491 | A | 4/1983 | Joy et al. |
| 4,481,171 | A | 11/1984 | Baran et al. |
| 4,502,872 | A | 3/1985 | Ivester et al. |
| 4,519,990 | A | 5/1985 | Bevilaqua et al. |
| 4,560,543 | A | 12/1985 | Caspersen et al. |
| 4,571,311 | A | 2/1986 | Ferguson, Jr. et al. |
| 4,619,404 | A | 10/1986 | Rasmussen |
| 4,755,366 | A | 7/1988 | Schwartzbach |
| 2010/0319538 | A1* | 12/2010 | Ahman et al. ....... B01D 53/505 95/149 |
| 2011/0107912 | A1* | 5/2011 | Ahman et al. ....... B01D 53/505 95/149 |

OTHER PUBLICATIONS

Search Report issued from European Patent Office dated Nov. 9, 2015 for EP Application No. 15171883.0.

* cited by examiner

*Primary Examiner* — Jill Warden
*Assistant Examiner* — Joye L Woodard
(74) *Attorney, Agent, or Firm* — Rita D. Vacca (57) ABSTRACT

A spray dryer disperser 24, 26, 28, 30 is described for use in a spray dryer absorption (SDA) system 18 for flue gas FG impurity reduction. As such, the spray dryer disperser 24, 26, 28, 30 disperses absorbent liquid or reagent slurry droplets into contact with a hot flue gas FG stream containing gaseous impurities to produce a flue gas FG stream of reduced impurity content and dry powder end products EP. The spray dryer disperser 24, 26, 28, 30 is useful in larger capacity SDA vessels 22 of approximately 12 to 22 meters in diameter or larger, to avoid disperser 24, 26, 28, 30 shroud 34a scale deposits, to avoid reagent slurry spray cloud suppression, to avoid vessel 22 wall 22b scale deposits and to achieve increased droplet rotational momentum for increased droplet flue gas FG penetration for efficient impurity reduction.

12 Claims, 3 Drawing Sheets

HIGH ROTATIONAL MOMENTUM DISPERSER AND USE

FIELD OF THE DISCLOSURE

The present disclosure relates to a spray dryer disperser for use in a spray dryer absorption (SDA) system for contacting a hot flue gas stream containing gaseous impurities with an absorbent material to produce a flue gas stream of reduced impurity content and dry powder products. More specifically, the present disclosure relates to a relatively high rotational momentum disperser for use in a relatively larger capacity SDA vessel of approximately 12 to approximately 22 meters or larger in diameter, that avoids disperser shroud deposits, avoids spray cloud suppression, avoids vessel wall deposits and achieves extended droplet penetration for required impurity removal efficiency with reduced absorbent material consumption.

BACKGROUND OF THE DISCLOSURE

Combustion of fuel, particularly carbonaceous materials such as fossil fuels and waste, results in hot flue gas streams that contain impurities, such as mercury (Hg), sulfur oxides (SOx), nitrogen oxides (NOx), and particulates, such as fly ash, which must be removed or reduced to a more acceptable level prior to release of the flue gas to the environment. In response to regulations in place in many jurisdictions, numerous processes and equipment systems have been developed to remove or reduce impurity levels and/or particulates in flue gas.

Typical methods of reducing flue gas particulates, Hg, NOx, and SOx impurities from steam generating boilers powered by fuel combustion is through the use of flue gas treatment equipment. Such equipment includes electrostatic precipitators (ESP), fabric filter bag houses, selective catalytic reduction (SCR) systems, wet flue gas desulfurization (WFGD) systems and/or dry flue gas desulfurization (DFGD) systems.

In some flue gas stream processing systems, removal of acidic components, such as SOx, is facilitated through the use of a DFGD system, wherein a reagent slurry or solution is dispersed in the flue gas stream to react with the SOx present therein. Current DFGD systems utilize spray dryer absorber vessels equipped with an atomizer system that receives a reagent slurry, typically in combination with a dilution liquid, and disperses it within the vessel for contact with the flue gas. Upon contact, the reagent slurry reacts with the impurities to produce dry powder products and a flue gas stream of reduced impurity content.

U.S. Pat. No. 4,226,603 discloses an atomizing device arranged centrally in an atomizing chamber. A processing gas is supplied around the atomizing device through a conical guide duct communicating with a horizontal spiral duct through an annular mouth. Processing gas distribution is adjusted by deflection of the gas stream from the spiral duct into the conical guide duct by means of two separate sets of stationary guide vanes arranged relatively close to and overlaying each other in the mouth. A damper is arranged along the mouth to control the ratio of the portions of the gas stream conducted into each of the two vane sets.

U.S. Pat. No. 4,481,171 discloses a spray reactor for flue gas desulfurization equipped with an atomizing disc to spray an alkaline reagent into the flue gas. Concentric inner and outer annular passages around the atomizing disc convey the flue gas. The outer passage flow is controlled by a series of dampers adapted to maintain a relatively constant flow velocity in the inner passage in response to turndown of the load.

U.S. Pat. No. 4,519,990 discloses an atomizer located in an upper portion of a chamber for introducing a finely dispersed spray of aqueous medium, and a gas injection means for receiving a major portion of a hot gas stream for introduction circumferentially about the atomizer. An essential feature of the apparatus is that a minor portion of the hot gas stream is introduced into the chamber in a direction counter to the direction of swirl of the major portion of the hot gas stream passing downwardly through the chamber from about the atomizer.

U.S. Pat. No. 4,560,543 discloses an absorption chamber in which a stream of waste gas is injected downwards from an upper part thereof with an aqueous liquid containing an absorbent atomized into the gas stream. The water content of the aqueous liquid is adjusted depending on the drying capacity of the downward gas stream so the drying of the atomized liquid produces a particulate material having a moisture content of at least 3 percent by weight, to at least 10 percent by weight. A second gas stream is introduced upwards from a bottom part of the absorption chamber at a rate sufficient for fluidizing the moist particulate material within the absorption chamber.

U.S. Pat. No. 4,571,311 discloses a process gas treatment chamber with a pair of concentric, inner and outer annular gas inlet ducts surrounding a liquid spray apparatus. Partition means divide a spiral supply duct into independent inner and outer sub-ducts which define separate inner and outer flow passages connected respectively to the inner and outer annular gas inlet ducts. Damper means are provided in the inlet to the outer sub-duct to selectively control the flow of process gas there through as a means of maintaining the velocity of the flow of process gas through the inner flow passage at a minimum acceptable velocity.

U.S. Pat. No. 4,619,404 discloses a gas distribution arrangement with a helical inlet duct through an annular orificial slit for processing gas introduction into a space between two coaxial guide walls. Guide vanes are provided in the orificial slit to impart a change of direction to the flow of processing gas. Each guide vane is a spatial body with differently extending, vertical limitation surfaces which between adjacent vanes delimit ducts whose sectional area as measured transversely of the flow direction of the processing gas through the individual duct is substantially of the same size over the extent of the duct. The vertical height of the guide vanes may decrease along their radial extent inwards in the orificial slit, and their vertical limitation surfaces may form an acute angle at the radially innermost ends of the guide vanes.

Delivery of a reagent slurry or solution to an atomizer system such as one or more of those described above, in combination with a dilution liquid, typically results in scale buildup. Scale buildup causes plant or system shut downs for necessary cleaning and/or maintenance. Plant or system shut downs, as well as the related cleaning and maintenance of the system and/or plant, is time consuming and costly.

Further, in the case of larger capacity SDA vessels of approximately 12 to approximately 22 meters or larger in diameter, which are desirable to reduce capital expenditures and reduce equipment footprint requirements, scale buildup is even a greater issue. Current dispersers do not allow slurry droplets to penetrate the flue gas sufficiently under higher volume flue gas stream flow as characteristic through the larger capacity SDA vessels. The higher volume flue gas stream thereby readily suppresses downwardly the droplet spray cloud within the SDA vessel. Droplet spray cloud suppression in turn causes poor contact between the reagent slurry and flue gas, resulting in low $SO_x$ removal efficiency. Attempts to address low $SO_x$ removal efficiency by using an increased number of dispersers within the larger capacity SDA vessels of approximately 12 to approximately 22 meters or larger in diameter, results in additional problems. Such additional problems include intense droplet impactions on vessel walls and significant scale buildup thereon with associated high reagent consumption and cost. Accordingly, an efficient and economical disperser for use in larger capacity SDA vessels of approximately 12 to approximately 22 meters or larger in diameter, that avoids disperser shroud deposits, avoids spray cloud suppression, avoids vessel wall deposits and achieves extended droplet penetration through the flue gas for required impurity removal efficiency with reduced absorbent material consumption is needed.

SUMMARY OF THE DISCLOSURE

A relatively high rotational momentum disperser is disclosed herein operable for efficient atomized slurry distribution across a relatively larger capacity spray dryer absorption (SDA) vessel of approximately 12 to approximately 22 meters or larger in diameter, while avoiding disperser shroud deposits, avoiding spray cloud suppression, avoiding vessel wall deposits and achieving extended droplet penetration through the flue gas for required impurity removal efficiency with reduced absorbent material consumption.

The subject SDA system equipped with a relatively larger capacity SDA vessel of approximately 12 to approximately 22 meters or larger in diameter is operative for efficiently removing gaseous pollutants from a hot flue gas stream. The subject SDA system comprises a SDA vessel of approximately 12 to approximately 22 meters or larger in diameter defining an interior chamber with one or more relatively high rotational momentum dispersers of approximately 4 to approximately 5 meters in diameter mounted at a roof of the interior chamber. Each such relatively high rotational momentum disperser is operative for dispersing a portion of the hot flue gas to be treated around a respective atomizer. Each atomizer is operative for atomizing and dispersing an absorption liquid, such as a reagent slurry, within the interior chamber for contact with, reaction with, and absorption of gaseous pollutants from the hot flue gas.

The subject relatively high rotational momentum disperser for use in a relatively larger capacity SDA vessel of approximately 12 to approximately 22 meters or larger in diameter, includes three annular channels formed concentrically around a central atomizer. The three annular channels include an inner channel, a middle channel and an outer channel. The inner channel is approximately 10 centimeters to approximately 20 centimeters in width, or approximately 15 centimeters in width extending around and adjacent to a central atomizer. The inner channel provides a constant flow area meaning that the width of the inner channel is slightly larger at the outlet bottom than at the inlet top. Optionally, the inner channel may include a vane pack comprising a plurality of approximately 8 to approximately 12 rotational vanes. Each vane in the vane pack is of a like angle of approximately 25 to approximately 35 degrees, or approximately 30 degrees from vertical. In using the subject disperser, hot flue gas flowing through the inner channel is imparted a relatively strong downward rotational flow to deflect the direction of dispersal of atomized slurry droplets radially downwardly to avoid slurry deposits or build-up on the disperser shroud. Around and immediately adjacent to the inner channel is a middle channel.

The middle channel houses a vane pack comprising a plurality of approximately 20 to approximately 30, or approximately 25 rotational vanes. Each vane in the vane pack is of a like angle of approximately 35 degrees to approximately 45 degrees, or approximately 40 degrees from vertical. The middle channel is sized to provide approximately 65 to approximately 80 percent of the total flow area of the disperser. As such, each the inner channel and the outer channel is sized to provide approximately 7 to approximately 15 percent of the total flow area of the disperser. In using the subject disperser, hot flue gas flowing through the angled rotating vanes of the middle channel is imparted a relatively strong rotational movement that extends penetration of the slurry droplets into a greater proportion of the hot flue gas flowing from the disperser throughout the interior chamber. The rotational movement imparted to flue gas flowing through the middle channel is of the same clockwise or counter clockwise direction as that imparted to the flue gas by the inner channel should an optional vane pack be utilized there as well. Around and immediately adjacent to the middle channel, with an outer wall defined by the disperser housing, is the outer channel.

The outer channel is approximately 10 centimeters to approximately 18 centimeters in width, or approximately 13 centimeters to approximately 15 centimeters in width. In using the subject disperser, hot flue gas flowing through the outer channel is imparted a relatively strong downward flow that deflects the direction of slurry droplet dispersal from radial to axial relative to the rotational axis of the atomizer. This deflection of direction of slurry droplet dispersal avoids slurry droplets from impacting the interior chamber walls thus reducing or avoiding deposit formation thereon.

In summary, the subject SDA system for flue gas impurity reduction comprises a vessel defining an interior chamber of approximately 12 to Approximately 22 meters or larger in diameter. One or more dispersers are arranged in a roof of the interior chamber with an atomizer for atomization and dispersal of absorption liquid or reagent slurry droplets therefrom across the interior chamber, centered therein and surrounded by a flow directing device. The flow directing device comprises three annular channels formed concentrically around the atomizer for a flow of flue gas therethrough. Of the three annular channels, the inner channel without vanes, or optionally with a vane pack comprising a plurality of approximately 8 to approximately 12 rotational vanes of like angle of approximately 25 to approximately 35 degrees, or approximately 30 degrees from vertical, reduces scale formation on the disperser shroud. The middle channel comprises a plurality of rotational vanes angled approximately 35 degrees to approximately 55 degrees from vertical to increase droplet rotational momentum and droplet penetration through the flue gas stream, and the outer channel reduces scale formation on interior chamber walls. The absorption liquid or reagent slurry droplets dispersed by the atomizer absorb flue gas impurities and dry to form a powder end product collected in the interior chamber.

The subject disperser for an interior chamber defined by a spray dryer absorption vessel, is approximately 4 meters or larger in diameter and comprises an atomizer for atomization and dispersal of absorption liquid or reagent slurry droplets therefrom across the interior chamber. The atomizer is centered within the disperser and surrounded by a flow directing device. The flow directing device surrounding the atomizer comprises three annular channels for a flow of flue gas therethrough. Of the three annular channels, the inner channel without vanes, or optionally with a vane pack comprising a plurality of approximately 8 to approximately 12 rotational vanes of like angle of approximately 25 to approximately 35 degrees, or approximately 30 degrees from vertical, reduces scale formation on the disperser shroud. The middle channel comprises a plurality of rotational vanes angled approximately 35 degrees to approximately 55 degrees from vertical to increase droplet rotational momentum for efficient flue gas penetration and flue gas impurity reduction. The outer channel reduces scale formation on interior chamber walls. The absorption liquid or reagent slurry droplets atomized and dispersed by the atomizer absorb flue gas impurities and dry to form a powder end product collected in the interior chamber.

A method of using the subject spray dryer absorption system for flue gas impurity reduction comprises providing a vessel defining an interior chamber of approximately 12 to approximately 22 meters or larger in diameter and arranging one or more dispersers of approximately 4 meters or larger in diameter in a roof of the interior chamber. An atomizer for atomization and dispersal of absorption liquid or reagent slurry droplets therefrom across the interior chamber is centered within the disperser and surrounded by a flow directing device. The flow directing device comprises three annular channels formed concentrically around the atomizer for a flow of flue gas therethrough. Of the three annular channels, the inner channel without vanes, or optionally with a vane pack comprising a plurality of approximately 8 to approximately 12 rotational vanes of like angle of approximately 25 to approximately 35 degrees, or approximately 30 degrees from vertical, reduces scale formation on the disperser shroud. The middle channel comprises a plurality of rotational vanes angled approximately 35 degrees to approximately 55 degrees from vertical to increase droplet rotational momentum and flue gas penetration, and the outer channel reduces scale formation on interior chamber walls. Droplets atomized and dispersed by the atomizer absorb impurities from the flue gas for flue gas impurity reduction. Also, the absorption liquid or reagent slurry droplets dry to form a powder end product collected in the interior chamber.

A method of using the subject disperser for flue gas impurity reduction comprises providing a vessel defining an interior chamber of approximately 12 to approximately 22 meters or larger in diameter, and arranging one or more dispersers of approximately 4 meters or larger in diameter in a roof of the interior chamber. An atomizer for atomization and dispersal of absorption liquid or reagent slurry droplets therefrom across the interior chamber is centered within the disperser, and surrounded by a flow directing device. The flow directing device comprises three annular channels formed concentrically around the atomizer for a flow of flue gas therethrough. Of the three annular channels, the inner channel without vanes, or optionally with a vane pack comprising a plurality of approximately 8 to approximately 12 rotational vanes of like angle of approximately 25 to approximately 35 degrees, or approximately 30 degrees from vertical, reduces scale formation on the disperser shroud. The middle channel comprises a plurality of rotational vanes angled approximately 35 degrees to approximately 55 degrees from vertical to increase droplet rotational momentum and flue gas penetration, and the outer channel reduces scale formation on interior chamber walls. Droplets atomized and dispersed by the atomizer absorb impurities from the flue gas for flue gas impurity reduction. Additionally, the droplets dry to form a powder end product collected in the interior chamber.

A method of making the subject spray dryer absorption system for flue gas impurity reduction comprises providing a vessel defining an interior chamber of approximately 12 to approximately 22 meters or larger in diameter, and arranging one or more dispersers approximately 4 meters or larger in diameter in a roof of the interior chamber. An atomizer for atomization and dispersal of absorption liquid or reagent slurry droplets therefrom across the interior chamber, is centered within the disperser and surrounded by a flow directing device. The flow directing device comprises three annular channels formed concentrically around the atomizer for a flow of flue gas therethrough. Of the three annular channels, the inner channel without vanes, or optionally with a vane pack comprising a plurality of approximately 8 to approximately 12 rotational vanes of like angle of approximately 25 to approximately 35 degrees, or approximately 30 degrees from vertical, reduces scale formation on the disperser shroud. The middle channel comprises a plurality of rotational vanes angled approximately 35 degrees to approximately 55 degrees from vertical to increase droplet rotational momentum and flue gas penetration, and the outer channel reduces scale formation on interior chamber walls. Droplets atomized and dispersed by the atomizer absorb impurities from the flue gas for flue gas impurity reduction and dry to form a powder end product collected in the interior chamber.

A method of making the subject disperser for flue gas impurity reduction comprises centering an atomizer for atomization and dispersal of absorption liquid or reagent slurry droplets therefrom across an interior chamber defined by a vessel of approximately 12 to approximately 22 meters or larger in diameter, and surrounding the atomizer with a flow directing device. The flow directing device comprises three annular channels formed concentrically around the atomizer for a flow of flue gas therethrough. Of the three annular channels, the inner channel without vanes, or optionally with a vane pack comprising a plurality of approximately 8 to approximately 12 rotational vanes of like angle of approximately 25 to approximately 35 degrees, or approximately 30 degrees from vertical, reduces scale formation on the disperser shroud. The middle channel comprises a plurality of rotational vanes angled approximately 35 degrees to approximately 55 degrees from vertical to increase droplet rotational momentum and flue gas penetration, and the outer channel reduces scale formation on interior chamber walls. Droplets atomized and dispersed by the atomizer absorb impurities from the flue gas for flue gas impurity reduction and dry to form a powder end product collected in the interior chamber.

Additional features and advantages of the subject disclosure will be readily apparent from the following description in which a preferred embodiment has been set forth in detail in conjunction with accompanying drawings.

BRIEF DESCRIPTION OF THE DRAWINGS

The subject disclosure will now be described in more detail with reference to the appended drawings in which.

DETAILED DESCRIPTION

Figure 1:
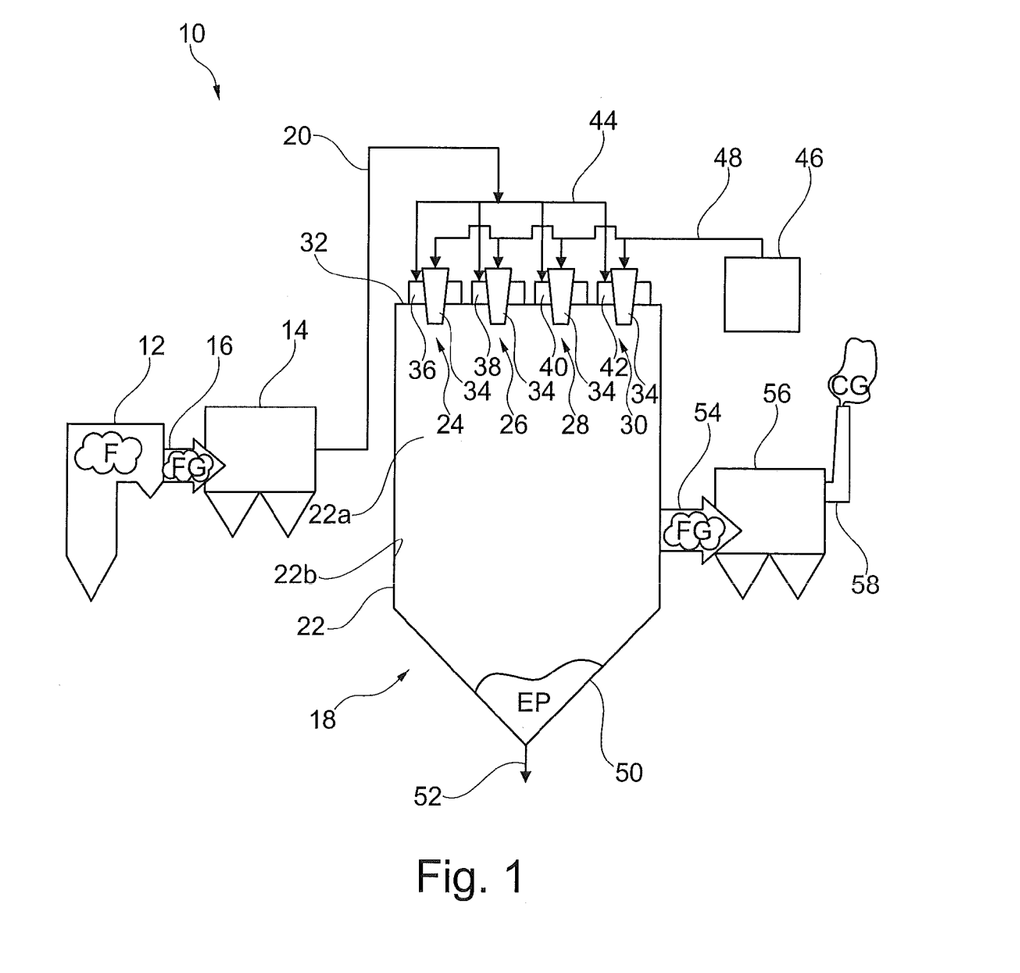
FIG. 1 is a schematic side view of a power plant.

FIG. 1 is a schematic side view illustrating a power plant 10. The power plant 10 comprises a boiler 12 in which a fuel F, such as coal or oil, is combusted. The combustion of the fuel generates a hot process gas in the form of a flue gas FG.

Sulphur species contained in the coal or oil produce upon combustion sulphur dioxide, which forms part of the flue gas FG. The flue gas FG flows from the boiler 12 to a fluidly connected electrostatic precipitator 14 via a duct 16. The electrostatic precipitator 14, an example of which is described in U.S. Pat. No. 4,502,872, the teachings of which incorporated herein by reference, serves to remove dust particles from the flue gas FG.

Flue gas FG, from which most of the dust particles have been removed, then flows to a fluidly connected spray dryer absorber (SDA) system 18 via a fluidly connected duct 20. The SDA system 18 comprises a relatively larger capacity SDA vessel 22 of approximately 12 to approximately 22 meters or larger in diameter. SDA vessel 22 defines interior chamber 22a. One or more dispersers, 24, 26, 28, 30 of approximately 4 to approximately 5 meters in diameter are mounted at a roof 32 of the interior chamber 22a. Each disperser 24, 26, 28, 30 comprises an atomizer 34. The atomizers 34 could be of the so-called rotary atomizer type, in which a wheel spinning at a high velocity is operative for atomizing an absorption liquid or a reagent slurry. In this regard, reference may be had by way of exemplification and not limitation, to the rotary atomizer described in U.S. Pat. No. 4,755,366, the teachings of which incorporated herein by reference. A further alternative is to utilize as atomizers 34 atomizing nozzles which atomize an absorption liquid or reagent slurry supplied thereto under pressure.

Each disperser 24, 26, 28, 30 also comprises a flow directing device 36, 38, 40, 42. A dividing duct 44 supplies each of the fluidly connected dispersers 24, 26, 28, 30 with a portion of the flue gas FG from fluidly connected duct 20. Each of the flow directing devices 36, 38, 40, 42 is operative for imparting the respective portion of flue gas FG flowing therethrough with movement, described in greater detail below, around atomizers 34 of the respective dispersers 24, 26, 28, 30.

A supply source or tank 46 supplies each fluidly connected atomizer 34 with a flow of an absorption liquid or reagent slurry via fluidly connected distributing pipe 48. Such absorption liquid or reagent slurry comprises, for example, a limestone slurry with a dilution liquid of, for example, water.

The action of the respective dispersers 24, 26, 28, 30 result in the mixing of flue gas FG with the absorption liquid or reagent slurry within interior chamber 22a. The result is that the absorption liquid or reagent slurry absorbs gaseous pollutants, such as sulphur dioxide, $SO_2$, from the flue gas FG. At the same time the absorption liquid or reagent slurry absorbs the gaseous pollutants, the absorption liquid or reagent slurry is dried by the hot flue gas FG, producing a dry end product EP. The dry end product EP is collected at the bottom 50 of the interior chamber 22a. The dry end product EP is removed for disposal via a pipe 52 fluidly connected to interior chamber 22a. Flue gas FG, from which most of the gaseous pollutants have been removed, flows out of the SDA system 18 via a fluidly connected duct 54. As such, flue gas FG flows through duct 54, to a second filter 56, which may, for example, be an electrostatic precipitator. As alternative option, the second filter 56 may be a bag house or any other suitable filtering device. The second filter 56 removes most of the remaining dust particles, and any dried residues of the absorption liquid or reagent slurry entrained in the flue gas FG. A cleaned flue gas CG may then be released into the environment via a clean gas duct 58 fluidly connected to second filter 56.

Figure 2:
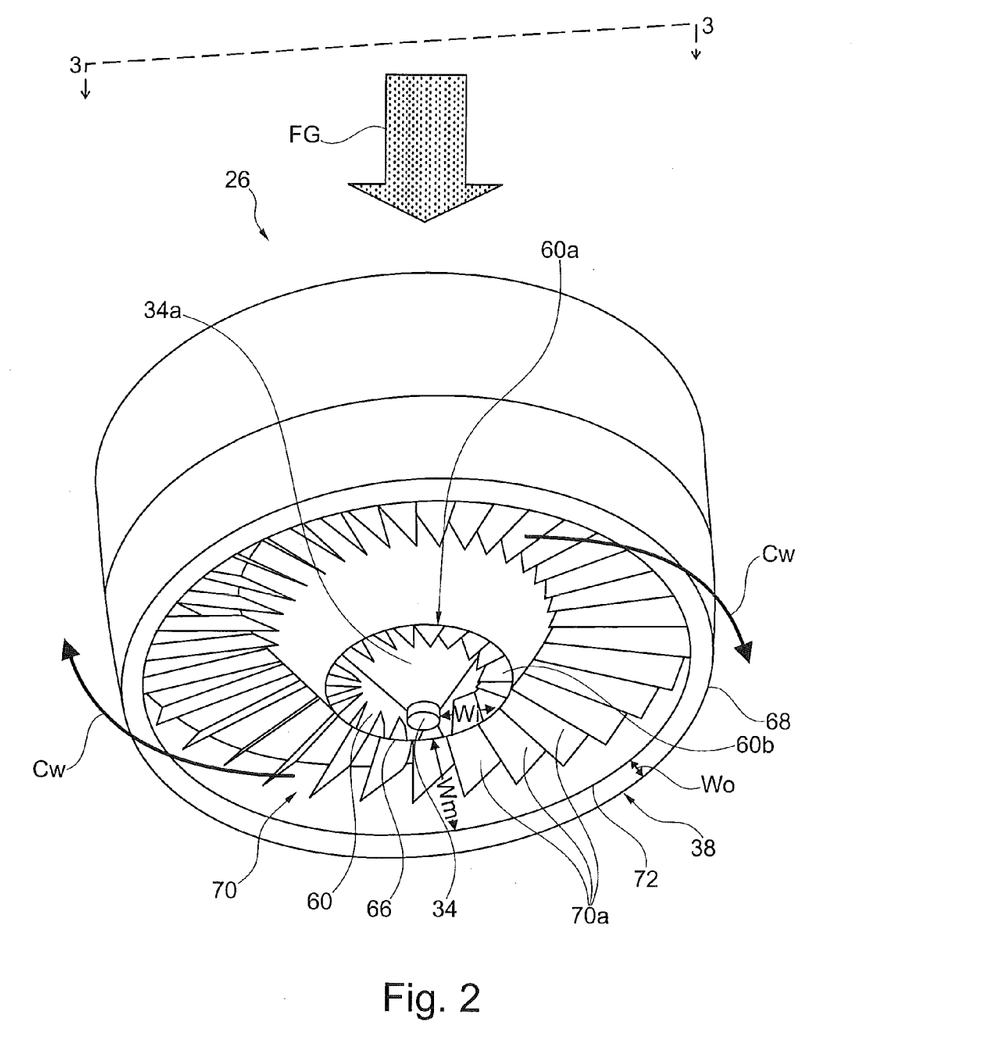
FIG. 2 is a schematic side perspective view of a disperser of FIG. 1 in accordance with one embodiment of the present invention.
Figure 3:
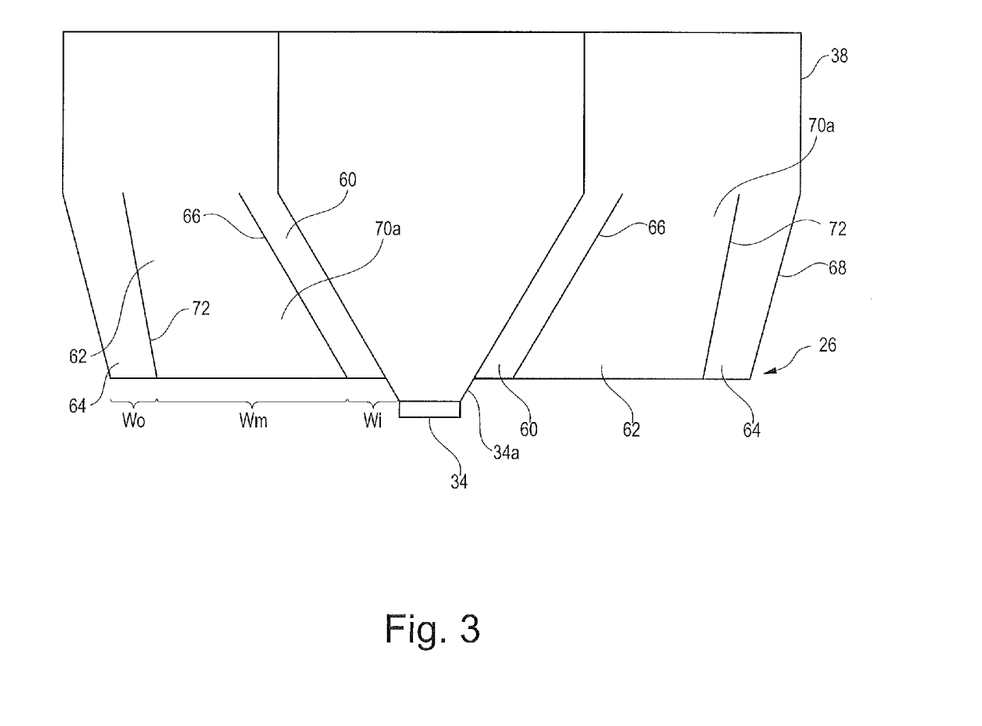
FIG. 3 is a schematic side cross-sectional view taken along line 3-3 of a disperser of FIG. 2 in accordance with the embodiment of FIG. 2.

FIGS. 2 and 3 illustrate the subject disperser 26 in more detail. The subject relatively high rotational momentum disperser 26 for use in a relatively larger capacity SDA vessel 22 of approximately 12 to approximately 22 meters or larger in diameter, includes three annular channels 60, 62 64 formed concentrically around a central atomizer 34. The three annular channels 60, 62, 64 include an inner channel 60, a middle channel 62 and an outer channel 64. The inner channel 60 extending around and adjacent to a central atomizer 34 is approximately 10 centimeters to approximately 20 centimeters in width Wi, or approximately 15 centimeters in width Wi measuring from central atomizer 34 to first wall 66. Optionally, the inner channel 60 may include a vane pack 60a comprising a plurality of approximately 8 to approximately 12 rotational vanes 60b. Each vane 60b in the vane pack 60a is of a like angle of approximately 25 to approximately 35 degrees, or approximately 30 degrees from vertical. In using the subject disperser 26, hot flue gas FG flowing through the disperser 26 and inner channel 60 of flow directing device 38 is imparted a relatively strong downward rotational flow to deflect the dispersal direction of atomized liquid or slurry droplets radially downwardly and outwardly to avoid liquid or slurry deposits on the disperser shroud 34a. Around and immediately adjacent to the inner channel 60 is a middle channel 62.

The middle channel 62 extending around and adjacent to inner channel 60 is sized to provide approximately 65 to approximately 80 percent of the total flow area of the disperser 26. As such, each the inner channel 60 and the outer channel 64 is sized to provide approximately 7 to approximately 15 percent of the total flow area of the disperser 26. The middle channel 62 extends around and adjacent to inner channel 60 and is approximately 20 centimeters to approximately 40 centimeters in width Wm, or approximately 30 centimeters in width Wm measuring from first wall 66 to second wall 72. Middle channel 62 houses a vane pack 70 comprising a plurality of approximately 10 to approximately 40 or approximately 20 to approximately 30 rotational vanes 70a. Each vane 70a in the vane pack 70 is of a like angle of approximately 35 degrees to approximately 55 degrees, or approximately 40 degrees to approximately 50 degrees, or approximately 45 degrees, from vertical. In using the subject disperser 26, hot flue gas FG flowing through angled rotating vanes 70a of the middle channel 62 is imparted a relatively strong rotational movement that extends penetration of the liquid or slurry droplets into a greater proportion of the hot flue gas FG flowing from the disperser 26 throughout the interior chamber 22a. The rotational movement imparted to flue gas FG flowing through middle channel 62 is of the same clockwise CW or counter clockwise CCW direction as that imparted to the flue gas FG by the inner channel 60. In using the subject disperser 26, hot flue gas FG flowing through the disperser 26 and the middle channel 62 of flow directing device 38 is deflected by angled rotating vanes 70a housed within middle channel 62 and thereby imparted a relatively strong rotational movement. In the case of disperser 26, this rotational movement is clockwise CW as illustrated by curved arrows in FIG. 2. However, as understandable to those skilled in the art, counter clockwise rotational movement could just as easily be imparted if desired by reversing the angle of vanes 70a. As such, the relatively strong rotational movement imparted to the hot flue gas FG by the relatively largely angled rotating vanes 70a increases the rotational momentum of and extends the penetration of the liquid or slurry droplets into a greater proportion of the hot flue gas FG flowing from disperser 26 throughout the interior chamber 22a. Around and immediately adjacent to the middle channel 62 is an outer channel 64.

Outer channel 64 is approximately 10 centimeters to approximately 20 centimeters in width Wo, or approximately 15 centimeters in width Wo measuring from second wall 72 to disperser housing 68. In using the subject disperser 26, hot flue gas FG flowing through the disperser 26 and the outer channel 64 of flow directing device 38 is imparted a relatively strong downward flow that deflects the direction of liquid or slurry droplet dispersal from radial to axial relative to the rotational axis of the atomizer 34. This axial downward velocity is approximately 18 m/s or greater. This direction deflection of liquid or slurry droplet dispersal avoids liquid or slurry droplets from impacting walls 22b of interior chamber 22a thus reducing or avoiding deposit formation thereon.

In summary, the subject SDA system 18 for flue gas FG impurity reduction comprises a vessel 22 defining an interior chamber 22a of approximately 12 to approximately 22 meters or larger in diameter. One or more dispersers 24, 26, 28, 30 are arranged in a roof 32 of the interior chamber 22a with an atomizer 34 for atomization and dispersal of absorption liquid or reagent slurry droplets therefrom across interior chamber 22a, centered therein and surrounded by a flow directing device 36, 38, 40, 42. The flow directing device 36, 38, 40, 42 comprises three annular channels 60, 62, 64 formed concentrically around the atomizer 34 for a flow of flue gas FG therethrough. Of the three annular channels 60, 62, 64, an inner channel 60 without or optionally with a vane pack 60a comprising a plurality of approximately 8 to approximately 12 rotational vanes 60b of a like angle of approximately 25 to approximately 35 degrees, or approximately 30 degrees from vertical, reduces scale formation on the disperser shroud 34a. A middle channel 62 comprising a plurality of rotational vanes 70a angled approximately 35 degrees to approximately 55 degrees, or approximately 40 degrees to approximately 50 degrees, or approximately 45 degrees from vertical increase droplet rotational momentum and droplet penetration through the flue gas FG stream. An outer channel 64 reduces scale formation on interior chamber 22a walls 22b. The absorption liquid or reagent slurry droplets dispersed by the atomizer 34 absorb flue gas FG impurities and dry to form a powder end product EP collected in the interior chamber 22a.

The subject disperser 24, 26, 28, 30 for a spray dryer absorption vessel 22 defining an interior chamber 22a of approximately 12 to approximately 22 meters or larger in diameter comprises an atomizer 34 for atomization and dispersal of absorption liquid or reagent slurry droplets therefrom across interior chamber 22a, centered within the disperser 24, 26, 28, 30 and surrounded by a flow directing device 36, 38, 40, 42. The flow directing device 36, 38, 40, 42 surrounding the atomizer 34 comprises three annular channels 60, 62, 64 for a flow of flue gas FG therethrough. Of the three annular channels 60, 62, 64, an inner channel 60 without or optionally with a vane pack 60a comprising a plurality of approximately 8 to approximately 12 rotational vanes 60b of a like angle of approximately 25 to approximately 35 degrees, or approximately 30 degrees from vertical, reduces scale formation on the disperser shroud 34a. A middle channel 62 comprises a plurality of rotational vanes 70a angled approximately 35 degrees to approximately 55 degrees, or approximately 40 degrees to approximately 50 degrees, or approximately 45 degrees from vertical to increase droplet rotational momentum for efficient flue gas FG penetration for flue gas FG impurity reduction. An outer channel 64 reduces scale formation on interior chamber 22a walls 22b. The absorption liquid or reagent slurry droplets atomized and dispersed by the atomizer 34 absorb flue gas FG impurities and dry to form a powder end product EP collected in the interior chamber 22a.

A method of using the subject spray dryer absorption system 18 for flue gas FG impurity reduction comprises providing a vessel 22 defining an interior chamber 22a of approximately 12 to approximately 22 meters or larger in diameter and arranging one or more dispersers 24, 26, 28, 30 in a roof 32 of the interior chamber 22a. An atomizer 34 for atomization and dispersal of absorption liquid or reagent slurry droplets therefrom across interior chamber 22a, is centered within the disperser 24, 26, 28, 30. Surrounding the atomizer 34 is a flow directing device 36, 38, 40, 42 comprising three annular channels 60, 62, 64 formed concentrically around the atomizer 34 for a flow of flue gas FG therethrough. Of the three annular channels 60, 62, 64, an inner channel 60 without or optionally with a vane pack 60a comprising a plurality of approximately 8 to approximately 12 rotational vanes 60b of a like angle of approximately 25 to approximately 35 degrees, or approximately 30 degrees from vertical, reduces scale formation on the disperser shroud 34a. A middle channel 62 comprises a plurality of rotational vanes 70a angled approximately 35 degrees to approximately 55 degrees, or approximately 40 degrees to approximately 50 degrees, or approximately 45 degrees from vertical to increase droplet rotational momentum and flue gas FG penetration. An outer channel 64 reduces scale formation on interior chamber 22a walls 22b. Droplets atomized and dispersed by the atomizer 34 absorb impurities from the flue gas FG for flue gas FG impurity reduction. Also, the absorption liquid or reagent slurry droplets dry to form a powder end product EP collected in the interior chamber 22a.

A method of using the subject disperser 24, 26, 28, 30 for flue gas FG impurity reduction comprises providing a vessel 22 defining an interior chamber 22a of approximately 12 to approximately 22 meters or larger in diameter, arranging one or more dispersers 24, 26, 28, 30 in a roof 32 of the interior chamber 22a, and centering an atomizer 34 for atomization and dispersal of absorption liquid or reagent slurry droplets therefrom across the interior chamber 22a. The atomizer 34 centered within the disperser 24, 26, 28, 30, is surrounded by a flow directing device 36, 38, 40, 42 comprising three annular channels 60, 62, 64 formed concentrically around the atomizer 34 for a flow of flue gas FG therethrough. Of the three annular channels 60, 62, 64, an inner channel 60 without or optionally with a vane pack 60a comprising a plurality of approximately 8 to approximately 12 rotational vanes 60b of a like angle of approximately 25 to approximately 35 degrees, or approximately 30 degrees from vertical, reduces scale formation on the disperser shroud 34a. A middle channel 62 comprises a plurality of rotational vanes 70a angled approximately 35 degrees to approximately 55 degrees, or approximately 40 degrees to approximately 50 degrees, or approximately 45 degrees from vertical to increase droplet rotational momentum and flue gas FG penetration. An outer channel 64 reduces scale formation on interior chamber 22a walls 22b. Droplets atomized and dispersed by the atomizer 34 absorb impurities from the flue gas FG for flue gas FG impurity reduction. Additionally, the droplets dry to form a powder end product EP collected in the interior chamber 22a.

A method of making the subject spray dryer absorption system 18 for flue gas FG impurity reduction comprises providing a vessel 22 defining an interior chamber 22a of approximately 12 to approximately 22 meters or larger in diameter, arranging one or more dispersers 24, 26, 28, 30 in a roof 32 of the interior chamber 22a, and centering an atomizer 34 for atomization and dispersal of absorption liquid or a reagent slurry droplets therefrom across the interior chamber 22a. Within the disperser 24, 26, 28, 30, and surrounding the atomizer 34 is a flow directing device 36, 38, 40, 42 comprising three annular channels 60, 62, 64 formed concentrically around the atomizer 34 for a flow of flue gas FG therethrough. Of the three annular channels 60, 62, 64, an inner channel 60 without or optionally with a vane pack 60a comprising a plurality of approximately 8 to approximately 12 rotational vanes 60b of a like angle of approximately 25 to approximately 35 degrees, or approximately 30 degrees from vertical, reduces scale formation on the disperser shroud 34a. A middle channel 62 comprises a plurality of rotational vanes 70a angled approximately 35 degrees to approximately 55 degrees, or approximately 40 degrees to approximately 50 degrees, or approximately 45 degrees from vertical to increase droplet rotational momentum and flue gas FG penetration. An outer channel 64 reduces scale formation on interior chamber 22a walls 22b. Droplets atomized and dispersed by the atomizer 34 absorb impurities from the flue gas FG for flue gas FG impurity reduction and dry to form a powder end product EP collected in the interior chamber 22a.

A method of making a disperser 24, 26, 28, 30 for flue gas FG impurity reduction comprises centering an atomizer 34 for atomization and dispersal of absorption liquid or reagent slurry droplets therefrom across an interior chamber 22a defined by a vessel 22 of approximately 12 to approximately 22 meters or larger in diameter, and surrounding the atomizer 34 with a flow directing device 36, 38, 40, 42. Flow directing device 36, 38, 40, 42 comprises three annular channels 60, 62, 64 formed concentrically around the atomizer 34 for a flow of flue gas FG therethrough. Of the three annular channels 60, 62, 64, an inner channel 60 without or optionally with a vane pack 60a comprising a plurality of approximately 8 to approximately 12 rotational vanes 60b of a like angle of approximately 25 to approximately 35 degrees, or approximately 30 degrees from vertical, reduces scale formation on the disperser shroud 34a. A middle channel 62 comprises a plurality of rotational vanes 70a angled approximately 35 degrees to approximately 55 degrees, or approximately 40 degrees to approximately 50 degrees, or approximately 45 degrees from vertical to increase droplet rotational momentum and flue gas FG penetration. An outer channel 64 reduces scale formation on interior chamber 22a walls 22b. Droplets atomized and dispersed by the atomizer 34 absorb impurities from the flue gas FG for flue gas FG impurity reduction and dry to form a powder end product EP collected in the interior chamber 22a.

While the subject disclosure has been described with reference to a preferred embodiment, it will be understood by those skilled in the art that various changes may be made and equivalents may be substituted for elements thereof without departing from the scope thereof. In addition, many modifications may be made to adapt a particular situation or material to the subject teachings without departing from the essential scope thereof. Therefore, the particular embodiment disclosed as the best mode contemplated is not intended to be limiting, but rather to include all embodiments falling within the scope of the appended claims. Moreover, the use of the terms first, second, etc. do not denote any order or importance, but rather the terms first, second, etc. are used to distinguish one element from another.

The invention claimed is:

1. A spray dryer absorption system for flue gas impurity reduction comprising:
   a vessel defining an interior chamber of approximately 12 meters or larger in diameter; and
   one or more dispersers arranged in a roof of the interior chamber with each disperser of the one or more dispersers comprising
   a shroud,
   an atomizer for atomization and dispersal of absorption liquid or a reagent slurry droplets therefrom, centered within the shroud and surrounded by a flow directing device, and
   the flow directing device comprising three annular channels formed concentrically around the atomizer for a flow of flue gas therethrough, wherein an inner channel reduces scale formation on the shroud, a middle channel sized to provide approximately 65 to approximately 80 percent of a total flow area of the flow directing device increases droplet rotational momentum and flue gas penetration, and an outer channel reduces scale formation on walls of the interior chamber.

2. The system according to claim 1, wherein the inner channel comprises a plurality of approximately 8 to approximately 12 rotational vanes.

3. The system according to claim 1, wherein the middle channel comprises a plurality of rotational vanes angled approximately 35 degrees to approximately 55 degrees from vertical.

4. The system according to claim 1, wherein the inner channel comprises a plurality of rotational vanes of a like angle of approximately 25 to approximately 35 degrees from vertical.

5. A disperser for a spray dryer absorption vessel defining an interior chamber of approximately 12 meters or larger in diameter comprising:
   a shroud;
   an atomizer for atomization and dispersal of absorption liquid or a reagent slurry droplets therefrom, centered within the shroud and surrounded by a flow directing device; and
   the flow directing device comprising three annular channels formed concentrically around the atomizer for a flow of flue gas therethrough, wherein an inner channel reduces scale formation on the shroud, a middle channel sized to provide approximately 65 to approximately 80 percent of a total flow area of the flow directing device increases droplet rotational momentum for efficient flue gas penetration for flue gas impurity reduction, and an outer channel reduces scale formation on walls of the interior chamber.

6. The disperser according to claim 5, wherein the inner channel comprises a plurality of approximately 8 to approximately 12 rotational vanes.

7. The disperser according to claim 5, wherein the middle channel comprises a plurality of rotational vanes angled approximately 35 degrees to approximately 55 degrees from vertical.

8. The disperser according to claim 5, wherein the inner channel comprises a plurality of rotational vanes of a like angle of approximately 25 to approximately 35 degrees from vertical.

9. A method of using a spray dryer absorption system for flue gas impurity reduction comprising:
   providing a vessel defining an interior chamber of approximately 12 meters or larger in diameter; and
   arranging one or more dispersers in a roof of the interior chamber through the steps of
   centering in a shroud an atomizer for atomization and dispersal of absorption liquid or a reagent slurry droplets therefrom, and
   surrounding the atomizer with a flow directing device comprising three annular channels formed concentrically around the atomizer for a flow of flue gas therethrough, wherein an inner channel reduces scale formation on the shroud, a middle channel sized to provide approximately 65 to approximately 80 percent of a total flow area of the flow directing device increases droplet rotational momentum and flue gas penetration, and an outer channel reduces scale formation on walls of the interior chamber, wherein droplets absorb impurities from the flue gas for flue gas impurity reduction.

10. The method of claim 9, wherein the interior chamber is operative for absorption liquid or reagent slurry droplets absorption of flue gas impurities and for collection of a dry powder end product formed therein.

11. The method of claim 9, wherein the middle channel comprises a plurality of rotational vanes angled approximately 35 degrees to approximately 55 degrees from vertical.

12. The method of claim 9, wherein the inner channel comprises a plurality of rotational vanes of a like angle of approximately 25 to approximately 35 degrees from vertical.

* * * * *